United States Patent
Wang

(10) Patent No.: US 9,681,005 B2
(45) Date of Patent: Jun. 13, 2017

(54) MOBILE COMMUNICATION DEVICE AND PROMPTING METHOD THEREOF

(71) Applicant: Hongxing Wang, Shenzhen (CN)

(72) Inventor: Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 3 days.

(21) Appl. No.: 15/080,380

(22) Filed: Mar. 24, 2016

(65) Prior Publication Data

US 2017/0026933 A1    Jan. 26, 2017

(30) Foreign Application Priority Data

Jul. 24, 2015    (CN) .......................... 2015 1 0444545

(51) Int. Cl.
    *H04B 1/38*      (2015.01)
    *H04M 19/04*      (2006.01)

(52) U.S. Cl.
    CPC ................................. *H04M 19/047* (2013.01)

(58) Field of Classification Search
    CPC ............................. H04W 68/02; H04M 19/047
    USPC ........................................................ 455/567
    See application file for complete search history.

(56) References Cited

U.S. PATENT DOCUMENTS

| | | | | |
|---|---|---|---|---|
| 5,135,079 A * | 8/1992 | Shimazaki | .......... | B66B 11/0015 181/206 |
| 5,701,349 A * | 12/1997 | Sano | .................. | G10K 11/1786 381/71.4 |
| 6,226,536 B1 * | 5/2001 | Miyashita | ............. | H02J 7/0047 455/425 |
| 2002/0041690 A1 * | 4/2002 | Enamito | ............ | G10K 11/1788 381/71.5 |
| 2008/0137883 A1 * | 6/2008 | Araki | ..................... | H04M 1/605 381/107 |
| 2010/0150377 A1 * | 6/2010 | Yoon | ...................... | H04R 3/002 381/98 |
| 2012/0045070 A1 * | 2/2012 | Mizuno | .............. | G10K 11/1782 381/66 |
| 2012/0195439 A1 * | 8/2012 | Ohta | .................... | G10K 11/178 381/71.4 |
| 2013/0136269 A1 * | 5/2013 | Sakamoto | ............ | G10K 11/178 381/71.4 |
| 2013/0195282 A1 * | 8/2013 | Ohita | ................. | G10K 11/1782 381/71.2 |
| 2013/0307441 A1 * | 11/2013 | Schuster | ................. | B06B 1/023 318/127 |
| 2013/0315409 A1 * | 11/2013 | Inoue | ................. | G10K 11/1784 381/71.1 |

(Continued)

*Primary Examiner* — April G Gonzales
(74) *Attorney, Agent, or Firm* — Na Xu; IPro, PLLC

(57) ABSTRACT

A mobile communication device is provided in the present disclosure. The mobile communication device includes a prompting module, a detecting module, a determining module and a control module. The prompting module includes a speaker and a vibrator. The detecting module is configured for detecting a vibrating noise corresponding vibration of the vibrator. The determining module is configured for determining whether the vibrating noise is less than a threshold value. The control module is configured for controlling an operation state of the speaker according to a determining result of the determining module. The present disclosure further provides a prompting method of the mobile communication device.

7 Claims, 2 Drawing Sheets

(56) References Cited

U.S. PATENT DOCUMENTS

2015/0117682 A1* 4/2015 Fukami ............... B06B 1/0603
 381/190
2016/0127814 A1* 5/2016 Lin ..................... H04R 1/02
 381/191

* cited by examiner

MOBILE COMMUNICATION DEVICE AND PROMPTING METHOD THEREOF

FIELD OF THE DISCLOSURE

The present disclosure relates to communication technologies, and more particularly, to a mobile communication device and a prompting method of the mobile communication device.

BACKGROUND

With development of mobile communication technologies, mobile communication devices, such as mobile phone, tablet computers, smart wearable devices, or the like, are used more and more widely. A typical mobile communication device has several prompting modes, for example, an outdoor mode, a regular mode, a vibration mode, and a mute mode.

In some circumstances, the mobile communication device may be desired to operate in the vibration mode to avoid ringtone of an incoming call or message from disturbing others nearby. While operating in the vibration mode, the mobile communication device raises vibration prompting for an incoming call or message by driving an internal vibrator thereof to vibrate. When the mobile communication device is not held or carried by the user, for example, when the mobile communication device is laid on an external medium such as a desktop, the user can only receive the vibration prompting by hearing a collision sound between the mobile communication device and the external medium. However, the collision sound may be too weak to be captured by the user, and this may cause the user to be unaware of the vibration prompting.

Therefore, it is desired to provide a new mobile communication device and a prompting method thereof which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
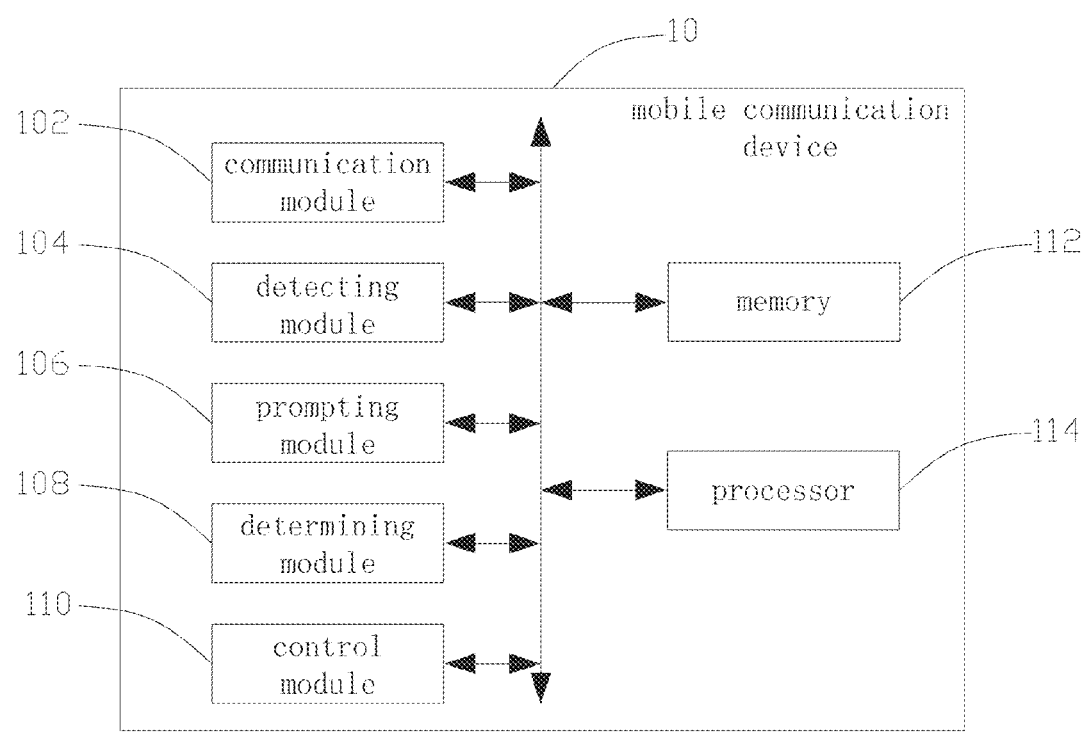
FIG. 1 is a block diagram of a mobile communication device according to an embodiment of the present disclosure.

Referring to FIG. 1, a mobile communication device 10 according to an embodiment of the present disclosure is shown. The mobile communication device 10 may be a mobile phone, a personal digital assistant, a tablet computer, a smart wearable device, or the like, which has a wireless communication function. The mobile communication device 10 includes a communication module 102, a detecting module 104, a prompting module 106, a determining module 108, a control module 110, a memory 112 and a processor 114.

The memory 112 is configured for storing function codes for the detecting module 104, the prompting module 106, the determining module 108 and the control module; and the processor 114 may implement the function codes stored in the memory 112.

In the present embodiment, the prompting module 106 may include a speaker and a vibrator. The communication module 102 is configured for enabling the mobile communication device 10 to perform communication functions, including a phone call function, a short message function, a multimedia message function, an instant message function and a push message function.

When the communication module 102 is activated, for example, when the mobile communication device 10 receives an incoming call or receives a message (including a short message, a multimedia message, an instant message, a push message or other messages), the vibrator of the prompting module 106 may be driven to perform vibration, and the detecting module 104 may detect a vibrating noise corresponding to the vibrator. In the present disclosure, the vibrating noise is defined as a vibrating sound of the vibrator and a collision sound generated by a collision between the mobile communication device and an external medium due to the vibration of the vibrator. The detecting module 106 may be a microphone configured for detecting the vibrating noise.

The determining module 108 is configured for determining whether the vibrating noise detected by the detecting module 106 is less than a threshold value; the control module 110 is configured for control an operation state of the speaker of the prompting module 106 according to a determining result of the determining module 108.

For example, when the determining module 108 determines that the vibrating noise detected by the detecting module 106 is not less than the threshold value, the control module 110 may control the speaker to be in a turned-off state and stop functioning, and the control module 110 may also control the vibrator to maintain the vibrating function.

When the vibrating noise is less than the threshold value, the determining module 108 may further determine whether the mobile communication device 10 is operated by the user within a predetermined time period; if the mobile communication device 19 is not operated within the predetermined time period, it may refer that the user is still unaware of the incoming call or the message, the control module 110 may further control the speaker to enter a turned-on state for generating audible sound corresponding to a ringtone. In contrast, when the mobile communication device 10 is operated by the user, it refers that the user is aware of the incoming call or the message, and thus the control module 110 may control the speaker to maintain operating in the turned-off state.

In the mobile communication device 10 as provided in the present disclosure, the speaker can be turned on when the vibrating noise of the vibrator is less than the threshold value, this can ensure the user to be aware of the incoming call or the message even if the mobile communication device 10 is not held or carried by the user, therefore, the mobile communication device 10 is more reliable.

Figure 2:
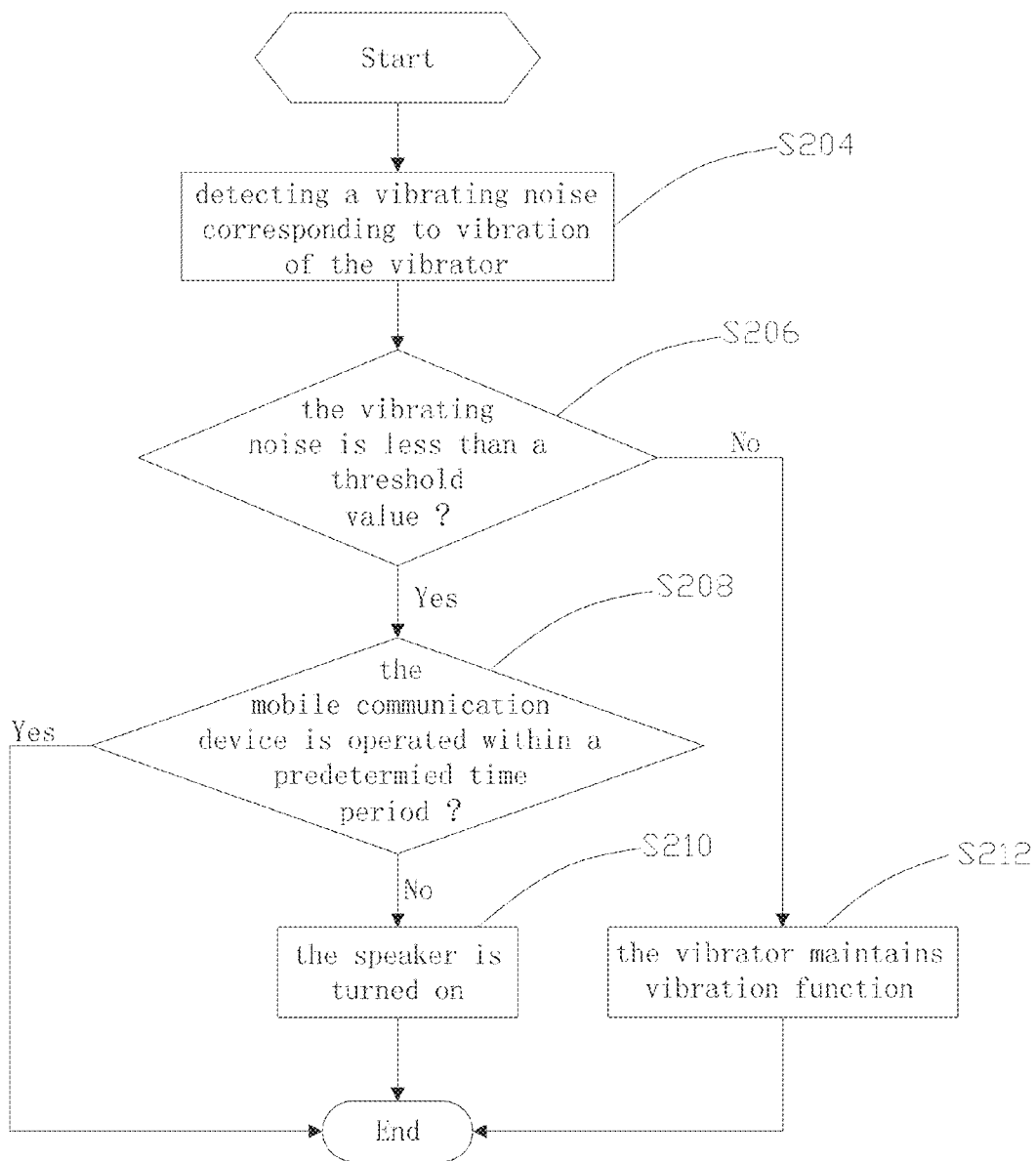
FIG. 2 is a flow chart of a prompting method of the mobile communication device of FIG. 1.

Base on the above-described mobile communication device 10, the present disclosure further provides a prompting method of a mobile communication device, which can be applied to the mobile communication device 10 when the mobile communication device 10 is activated (e.g., receiving an incoming call or receiving a message). Referring to FIG. 2, the prompting method of the mobile communication device mainly includes the following steps.

Step S204, the detecting module 104 detects a vibrating noise corresponding to vibration of the vibrator in the mobile communication device 10.

In step S204, the detecting module 104 of the mobile communication device 10 may use a microphone to detect the vibrating noise when the vibrator of the prompting module 106 is driven to vibrate. As described above, the vibrating noise refers to a vibrating sound of the vibrator and a collision sound generated by a collision between the mobile communication device and an external medium due to the vibration of the vibrator.

Step S206, the determining module 108 determines whether the vibrating noise is less than a threshold value; if so, the method is switched to step S208, otherwise the method is switched to step S212.

Step S208, the determining module 108 further determines whether the mobile communication device 10 is operated by the user within a predetermined time period.

In step S208, if the determining module 108 determines that the mobile communication device 19 is not operated within the predetermined time period, it may refer that the user is still unaware of the incoming call or the message, and then the method is switched to Step S210.

Step S210, the control module 110 controls the speaker to enter a turned-on state for generating audible sound corresponding to a ringtone.

Step S212, the control module 110 controls the vibrator to maintain vibration function when the determining module 108 determines that the vibrating noise is not less than the threshold value.

In step S212, when the determining module 108 determines that the vibrating noise is not less than the threshold value, it may refers that the vibrating noise corresponding to the vibration of the vibrator has sufficient intensity to draw the user's attention to the incoming call or the message, and thus the control module 110 controls the vibrator to maintain the vibrating function. In addition, since the vibrating noise is strong enough, it is unnecessary to turn on the speaker, thus the control module 110 may also control the speaker to maintain a turned-off state and stop functioning in order not to disturb others nearby.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication device, comprising:
a prompting module comprising a speaker and a vibrator;
a detecting module for detecting a vibrating noise corresponding to vibration of the vibrator;
a determining module for determining whether the vibrating noise is less than a threshold value; and
a control module for controlling an operation state of the speaker according to a determining result of the determining module, wherein
when the determining module determines that the vibrating noise is not less than the threshold value, the control module is configured for controlling the speaker to be in a turned-off state and configured for controlling the vibrator to maintain vibration function; when the determining module determines that the vibration noise is less than the threshold value, the determining module is configured for determining whether the mobile communication device is operated with a predetermined time period, and the control module is configured for controlling the speaker to enter a turned-on state for generating audible sound when the mobile communication device is operated within the predetermined time period.

2. The mobile communication device of claim 1, wherein the detecting module uses a microphone for detecting the vibrating noise.

3. The mobile communication device of claim 1, wherein the vibrating noise refers to a vibrating sound of the vibrator and a collision sound generated by a collision between the mobile communication device and an external medium due to the vibration of the vibrator.

4. A prompting method of a mobile communication device, comprising the steps of:
providing a vibrator and a speaker in the mobile communication device;
detecting a vibrating noise corresponding to vibration of the vibrator;
determining whether the vibrating noise is less than a threshold value; and
controlling an operation state of the speaker according to a determining result of the determining module,
determining whether the mobile communication device is operated by the user within a predetermined time period when the vibrating noise is less than the threshold value;
controlling the speaker to enter a turned-on state for generating audible sound when the mobile communication device is not operated by the user within a predetermined time period,
controlling the speaker to be in a turned-off state when the vibrating noise is not less than the threshold value.

5. The prompting method of claim 4, further comprising: controlling the vibrator to maintain vibration function when the vibrating noise is not less than the threshold value.

6. The prompting method of claim 4, wherein the vibrating noise is detected by a microphone.

7. The prompting method of claim 4, wherein the vibrating noise refers to a vibrating sound of the vibrator and a collision sound generated by a collision between the mobile communication device and an external medium due to the vibration of the vibrator.

* * * * *